Oct. 14, 1930.  W. J. ANSON  1,778,286
SEPARATOR
Filed Sept. 7, 1929
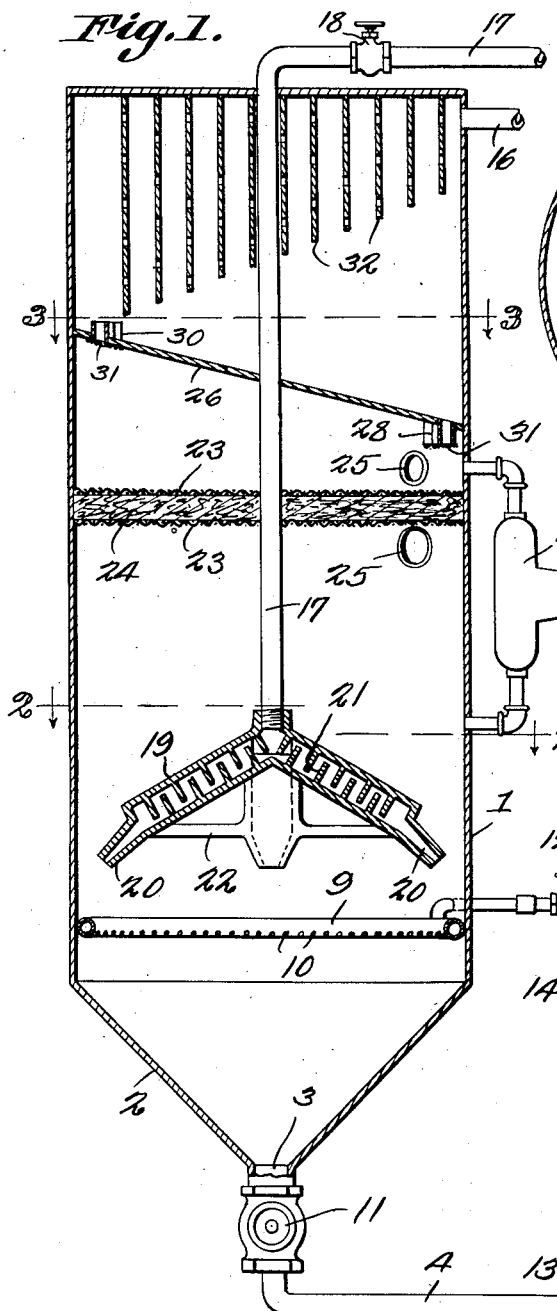
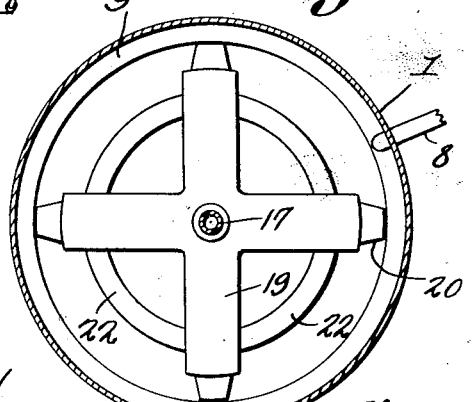
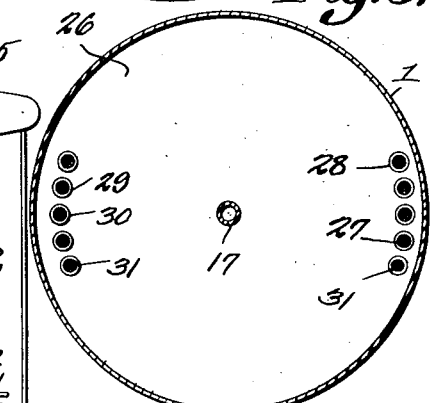
W. J. Anson, Inventor
By C. A. Snow & Co.
Attorneys.

Patented Oct. 14, 1930

1,778,286

UNITED STATES PATENT OFFICE

WARREN J. ANSON, OF BIG SPRING, TEXAS, ASSIGNOR TO FRANK N. EVANS, OF BIG SPRING, TEXAS

SEPARATOR

Application filed September 7, 1929. Serial No. 391,069.

This invention relates to a separator for use in the treatment of hydrocarbon oils whereby water and B. S. can be removed readily from the oil without the necessity of utilizing expensive equipment.

Another object is to provide a new and novel composition of matter for use in connection with the apparatus for facilitating separation of the parts.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred form of the invention has been shown.

In said drawing,

Figure 1 is a view partly in section and partly in elevation of the apparatus.

Figure 2 is a section on line 2—2, Figure 1.

Figure 3 is a section on line 3—3, Figure 1.

Referring to the figures by characters of rference, 1 designates an upstanding casing preferably cylindrical provided with a conical bottom 2 having a central opening 3 from which is extended an outlet pipe 4. This pipe leads to a tank 5 for holding the special composition used in carrying out the separating method. A pipe 6 leads from this container to a pump 7 used for forcing the composition upwardly through a pipe 8 to a distributing ring 9 arranged within the lower portion of the casing 1 above the bottom 2. This ring, which is formed of a pipe of any suitable size, has an annular series of small apertures 10 from which the composition is adapted to be delivered in small jets so as to spray downwardly into the bottom portion of the casing. Valves 11 and 12 can be located in the pipes 4 and 8 for the purpose of regulating the flow of fluid. Another valve 13 is provided in the pipe 4 and is connected by a rod 14 to a float mechanism indicated generally at 15 in communication with the interior of the casing.

Extending from the upper portion of casing 1 is an outlet pipe 16 for carrying off the treated oil and another pipe 17 opens downwardly into the casing from the top thereof for supplying untreated oil to the apparatus. Pipe 17 has a regulating valve 18. The lower end of the pipe 17 is connected to and opens into a delivering baffle of novel construction. This is in the form of downwardly diverging tubular arms 19 communicating at their upper ends with each other and with the pipe 17. Each of these arms is preferably rectangular in cross section and has an outlet nozzle 20 at its lower end for directing fluid against the wall of the casing 1. Within each arm are upper and lower baffles 21, the upper baffles extending downwardly between the lower baffles so that fluid flowing downwardly within the arms must of necessity follow a tortuous path before reaching the outlet nozzle 20 of each arm. The arms of the structure can be reinforced by braces 22 connecting the lower portions thereof.

Located within casing 1 above the baffle arms 19 is a filtering device including superposed foraminous partitions 23 between which is packed a filtering material 24 formed of iron shavings, excelsior, or the like.

Sight openings 25 are formed in the casing above and below the filtering partition and each of these openings is closed with glass so that the contents of the casing cannot escape although they can be inspected readily at any time.

Arranged in the casing 1 above the filtering partition is an inclined plate 26 constituting a baffle, this plate being secured through the length of its periphery to the wall of casing 1. In the lowermost portion of the baffle plate 26 is a series of openings 27 in each of which is fitted a short pipe 28 extending downwardly therefrom. Additional openings 29 are formed in the upper portion of the plate 26 close to its periphery and in these openings are fitted upwardly extending short pipes 30. The lower ends of the pipes 30 and 28 are all provided with screens 31.

Suspended from the top of casing 1 between pipes 30 and the outlet pipe 16 are baffles 32 of different lengths, the shortest baffle being positioned close to the pipe 16 and the sizes of these baffles increasing toward the pipes 30 where the longest baffle is located.

In practice there is provided in the container 5 a mixture of molasses and lime water. The proportions of these ingredients can be varied, depending on the condition of the hydrocarbon oil to be treated.

The oil to be treated is supplied to the apparatus through pipe 17, and as it flows into the tubular arms 19 it will work upwardly and downwardly between baffles 21 and finally be discharged in small streams against the wall of casing 1. This action will result in breaking up the globules consisting of oil and water. The fluid will flow into the bottom of the casing 1 and here will be sprayed by the mixture issuing from the apertures 10. As a result of this action, the oil, being lighter than the water, will rise to the surface of the water and the composition with which it is mixed and will ultimately flow through the filtering partition and thence to the baffle plate 26. By means of the filtering devices provided any impurities mixed with the oil will be separated therefrom and the oil, rising through the pipes 28 and 30 will flow toward pipe 16. It will, however, be retarded more or less by the baffles 32 so that any particles held in suspension will be allowed to gravitate.

Should the water in the casing 1 rise to an undesirable level the float mechanism 15 will actuate valve 13 to open it and allow the mixture in the bottom portion of the casing 1 to flow outwardly to the container 5. After the water level has been reduced in this way valve 13 will close. The mixture of water and composition in the container 5 can be used repeatedly until it has been greatly reduced in efficiency whereupon a new supply of treating mixture will be required.

It has been found in practice that oil treated in the manner described is quickly freed from water, B. S., and solid substances and as the apparatus is entirely free of moving parts except the float apparatus it will be apparent that the separating operation can be carried out at minimum cost.

What is claimed is:

1. Separating apparatus including a casing, diverging downwardly inclined tubular baffles supported in the casing, means for supplying thereto the hydrocarbon oil to be treated, outlet nozzles extending from the baffles for directing fluid against the wall of the casing, means below the baffles for spraying fluid delivered therefrom, filtering means interposed between the tubular baffles in the top of the casing, there being an outlet for treated oil above the filtering means, and baffles interposed between the filtering means and the outlet.

2. Separating apparatus including a casing, diverging downwardly inclined tubular baffles supported in the casing, means for supplying thereto the hydrocarbon oil to be treated, outlet nozzles extending from the baffles for directing fluid against the wall of the casing, means below the baffles for spraying fluid delivered therefrom, filtering means interposed between the tubular baffles in the top of the casing, there being an outlet for treated oil above the filtering means, and baffles interposed between the filtering means and the outlet and including an inclined plate having a series of screened openings adjacent the upper and lower portions thereof, and a plurality of depending plates above the inclined plate and extending from the top of the casing.

3. Apparatus of the class described including a casing having an outlet for treated oil, downwardly diverging tubular baffles supported in the casing, means for directing oil to be treated to said baffles, outlet spouts extending from the lower ends of the tubular baffles for directing oil to be treated to said baffles, outlet spouts extending from the lower ends of the tubular baffles for directing fluid against the wall of the casing, means beneath the baffles for spraying the fluid delivered therefrom, filtering means above the baffles, a container for holding treating fluid, means for conducting fluid from the bottom of the casing to said container, means for delivering fluid from said container to the spraying means, float apparatus in communication with the interior of the casing, and a valve operated by said apparatus for controlling the flow of fluid from the casing to the container.

In testimony that I claim the foregoing as my own, I have hereto affixed my signature.

WARREN J. ANSON.